(12) United States Patent
Kuenstel

(10) Patent No.: US 10,655,764 B2
(45) Date of Patent: May 19, 2020

(54) SEALING SLEEVE WITH LEAKAGE DETECTION

(71) Applicant: Eaton Industrial IP GmbH & Co. KG, Schoenefeld (DE)

(72) Inventor: Christian Kuenstel, Ettlingen (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 786 days.

(21) Appl. No.: 15/300,333

(22) PCT Filed: Mar. 31, 2015

(86) PCT No.: PCT/EP2015/057036
§ 371 (c)(1),
(2) Date: Sep. 29, 2016

(87) PCT Pub. No.: WO2015/150388
PCT Pub. Date: Oct. 8, 2015

(65) Prior Publication Data
US 2017/0146162 A1 May 25, 2017

(30) Foreign Application Priority Data

Mar. 31, 2014 (GB) .................................. 1405730.1

(51) Int. Cl.
*F16L 21/00* (2006.01)
*G01M 3/04* (2006.01)
(52) U.S. Cl.
CPC .......... *F16L 21/005* (2013.01); *G01M 3/045* (2013.01); *F16L 2201/30* (2013.01)

(58) Field of Classification Search
CPC .... F16L 21/005; F16L 2201/30; G01M 3/045
USPC ..................................................... 285/93, 417
See application file for complete search history.

(56) References Cited

U.S. PATENT DOCUMENTS

| | | |
|---|---|---|
| 2,759,175 A | 8/1956 | Spalding |
| 6,826,948 B1 | 12/2004 | Bhatti et al. |
| 2002/0071113 A1 | 6/2002 | Moran et al. |
| 2005/0062487 A1 | 3/2005 | Strackbein et al. |
| 2009/0326492 A1* | 12/2009 | Hietpas |
| 2011/0179861 A1 | 7/2011 | Grange et al. |
| 2016/0166438 A1* | 6/2016 | Rovaniemi |

FOREIGN PATENT DOCUMENTS

| | | |
|---|---|---|
| DE | 3930530 A1 | 3/1991 |
| WO | WO 8601621 A1 | 3/1986 |
| WO | WO 0223070 A1 | 3/2002 |
| WO | WO-2012101117 A2 * | 8/2012 |

* cited by examiner

*Primary Examiner* — Zachary T Dragicevich
(74) *Attorney, Agent, or Firm* — Leydig, Voit & Mayer, Ltd.

(57) ABSTRACT

A sealing sleeve with leakage detection has an absorbing layer and a sensor arrangement, wherein the absorbing layer is configured to be attached to a surface of an article containing a fluid, and hose assembly with a connector having a nipple and a socket, wherein an end of a hose is slipped on the nipple and the socket is adapted to establish a fluid tight connection of the hose and the nipple, wherein a sealing sleeve is attached at an intersection of the socket and the hose.

13 Claims, 1 Drawing Sheet

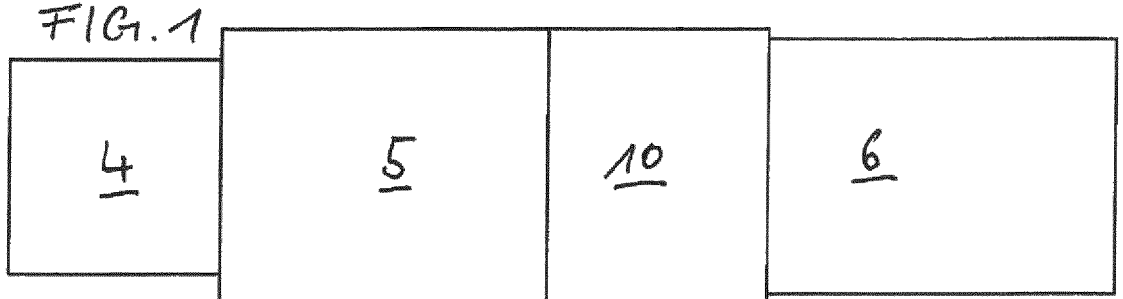
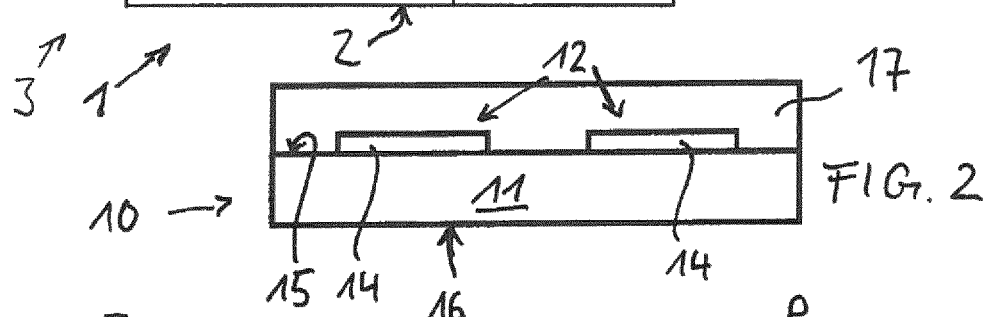
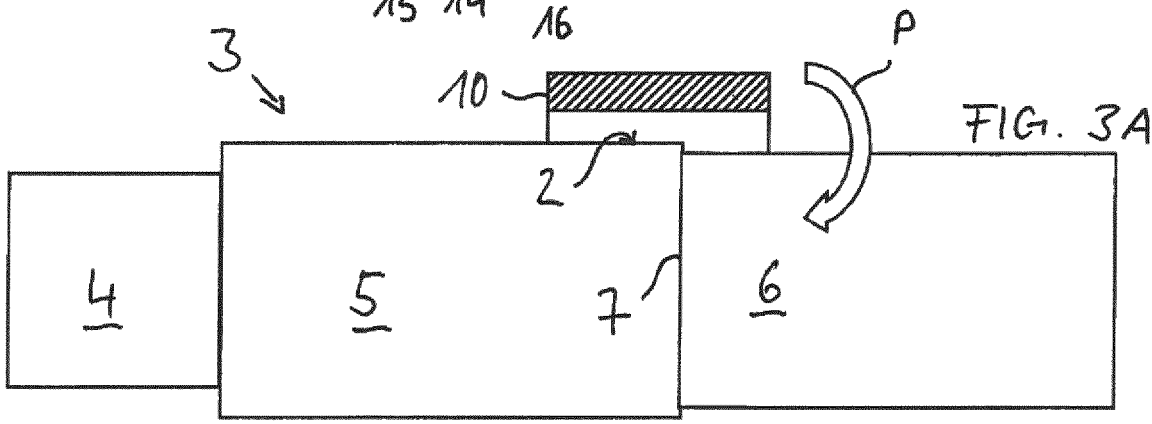
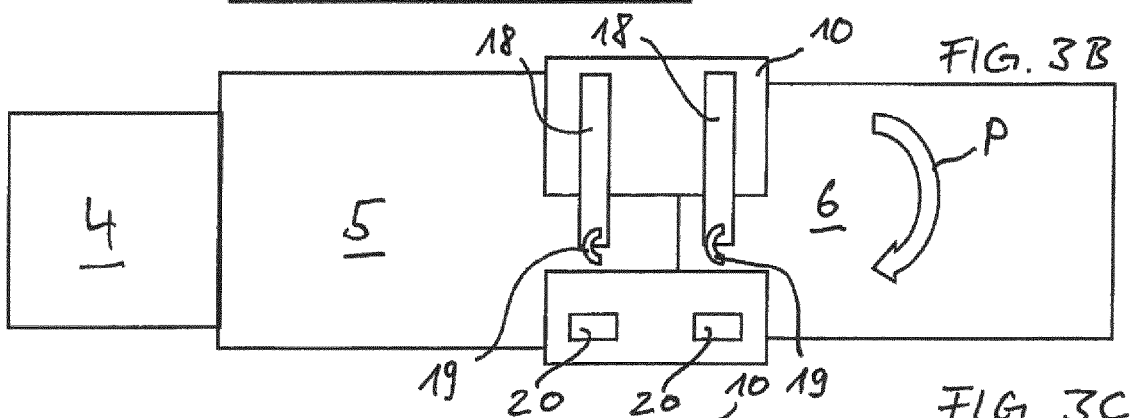
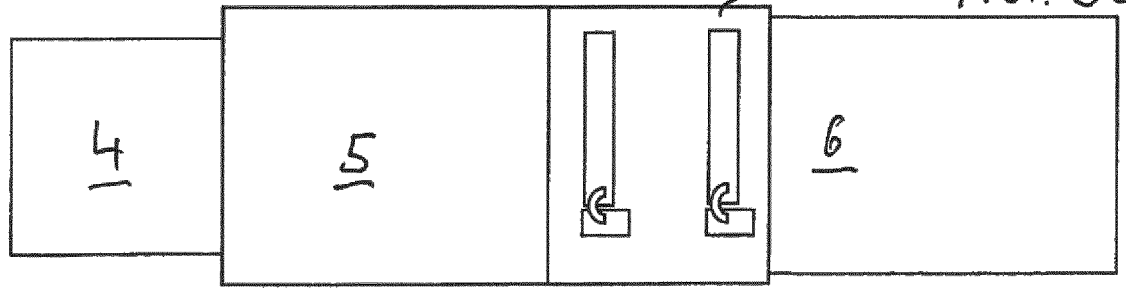

SEALING SLEEVE WITH LEAKAGE DETECTION

CROSS-REFERENCE TO RELATED APPLICATIONS

This application is a U.S. national stage application under 35 U.S.C. § 371 of International Application No. PCT/EP2015/057036, filed on Mar. 31, 2015, and claims benefit to British Patent Application No. 1405730.1, filed on Mar. 31, 2014. The International Application was published in English on Oct. 8, 2015, as WO 2015/150388 A1 under PCT Article 21(2).

FIELD

The invention relates to a sealing sleeve with leakage detection.

BACKGROUND

For hydraulic hose assemblies and, more generally, for any fluid containing or conveying article, there is a potential risk of leakage of the contained or conveyed fluid. The most critical locations for the appearance of a leakage are connections of two fluid conveying parts, like, for example, at a hose-fitting interface. A leakage can be detect visually when the fluid appears on a surface of the fluid containing or conveying article, for example, on the hydraulic hose or on the fitting.

According to WO 2010/004418 A1, a hose fault detection system includes a hose assembly with a fault detector. The hose assembly includes a first conductive layer, a second conductive layer, and an intermediate layer that is disposed between the first and second conductive layers. The fault detector is configured for detecting a change of an electrical characteristic of at least one of the first and second conductive layers of the hose, which is assumed to be caused by a fault of the hose assembly, for example, when the two conductive layers are short-circuited by leaking fluid.

However, at the moment the leakage can be detected, the fluid either is already in contact with the environment or the contact is at least imminent, such that a potential environmental contamination cannot be obviated. Further, the hose assembly with fault detection is expensive in production with the conductive layers arranged surroundingly and radially spaced to each other. Furthermore, in case of a malfunction of the detection circuit, the complete hose has to be exchanged, in order to restore the fault detection functionality.

SUMMARY

In an embodiment, the present invention provides a sealing sleeve with leakage detection, the sleeve comprising: an absorbing layer; and a sensor arrangement, wherein the absorbing layer is configured to be attached to a surface of an article containing a fluid and to absorb the fluid in case of a leakage, wherein the sensor arrangement includes a capacitive humidity sensor, wherein a thickness of the absorbing layer increases with an amount of absorbed fluid, and wherein the sensor arrangement is configured to detect a level of saturation of the absorbing layer with the fluid.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 illustrates schematically a hose assembly with an embodiment of a sealing sleeve according to the invention;

FIG. 2 illustrates schematically a composition of the sealing sleeve according to FIG. 1 in a cross section; and FIGS. 3A-3C illustrate schematically a procedure of attaching an alternative embodiment of a sealing sleeve to a hose assembly.

DETAILED DESCRIPTION

An aspect of the invention provides a sealing sleeve with leakage detection comprising an absorbing layer and a sensor arrangement, wherein the absorbing layer is configured to be attached to a surface of an article containing a fluid, and to a hose assembly with a connector comprising a nipple and a socket, wherein an end of a hose is slipped on the nipple and the socket is adapted to establish a fluid tight connection of the hose and the nipple, wherein a sealing sleeve is attached at an intersection of the socket and the hose.

In an embodiment, the present invention provides a leakage detection at a fluid containing or conveying article, wherein the fluid leakage is detected well in advance before a contaminating contact with environment occurs.

The sealing sleeve with leakage detection according to the invention comprises an absorbing layer and a sensor arrangement, wherein the absorbing layer is configured to be attached to a surface of an article containing a fluid and to absorb the fluid in case of a leakage, and wherein the sensor arrangement is configured to detect a level of saturation of the absorbing layer with the fluid.

An advantage of the sealing sleeve according to the invention is the absorption of the leaking fluid by the absorption layer, which is further detected by the sensor arrangement as the absorbing layer gets gradually saturated with the fluid. Notice of the detection can be given in advance of a contaminating contact of the fluid with environment. Thus, the article, like a hose assembly, for example, may be replaced or repaired before the leakage leads to environmental contamination. A further advantage of the sealing sleeve according to the invention is its basic structure, which makes it easy to attach and allows a production of the sealing sleeve at low costs.

According to a preferred embodiment a thickness of the absorbing layer increases with an amount of absorbed fluid. In particular, the absorbing layer consists of an EPDM rubber, i.e. an ethylene propylene diene monomer (M-class) rubber.

According to a further preferred embodiment the sensor arrangement comprises a capacitive humidity sensor. The sensor arrangement preferably comprises two electrodes with at least a portion of the absorption layer acting as a dielectric between the two electrodes.

According to a further preferred embodiment the two electrodes are attached to an outer side of the absorption layer, opposite to a side facing the surface of the article. That means the electrodes are arranged next to each other, aligned along the surface of the article. In terms of a hose assembly, typically comprising a circular cross-section, which means the two electrodes are arranged surrounding the hose assembly, distanced in a direction along a longitudinal axis of the hose assembly, which refers also to the direction of flow of the fluid inside the hose assembly. That means further that the two electrodes both are arranged at an identical distance to the surface of the hose assembly.

According to a further preferred embodiment the sensor arrangement is configured to transmit a signal if the level of saturation changes. The signal transmission may be carried out by sending the signal through a wire, or via a wireless connection. The sensor arrangement is preferably configured to transmit the signal prior to an emersion of the fluid from the absorption layer, i.e. well in advance before a full saturation of the absorption layer is reached.

According to a further preferred embodiment the sealing sleeve is confected in terms of a strip. The sealing sleeve strip is advantageously very easy to attach to any kind of fluid containing article, for example, around a hose assembly. It is even possible to adjust the length of the sealing sleeve strip to different hose diameters, or to level out different hose diameters with a flexible strip. More preferably, the sensor arrangement comprises two electrodes, wherein the electrodes are arranged in parallel along the strip.

According to an alternatively preferred embodiment the sealing sleeve is preassembled on a hose connector. Preassembly advantageously facilitates the attachment of the sealing sleeve and further prevents neglect to attach the sealing sleeve. More preferably, the sensor arrangement of the preassembled sealing sleeve comprises two electrodes provided as annular rings arranged in parallel around the absorption layer.

According to a further preferred embodiment the sealing sleeve further comprises at least one protective layer covering the absorption layer and the sensor arrangement. The protective layer is, for example, a layer made of a compound that is a blend of NBR and PVC, i.e. nitrile butadiene rubber and polyvinyl chloride. As alternative to the NBR and PVC blend, also an NBR and CR (chloroprene) compound is preferably used for the protective layer. The protective layer protects the absorption layer and the sensor arrangement from environmental influences. It is furthermore preferable to provide an additional metal layer as a kinking protection, if the application requires such an additional protection.

Another object of the invention is a hose assembly with a connector comprising a nipple and a socket, wherein an end of a hose is slipped on the nipple and the socket is adapted to establish a fluid tight connection of the hose and the nipple, wherein a sealing sleeve according to the present invention is attached, preferably at an intersection of the socket and the hose.

The sealing sleeve according to the invention is advantageously adapted to both detect and prevent a leakage on the hose assembly. At the hose-fitting intersection of the hose assembly, the sealing sleeve works most efficiently, as a leakage occurs in the most cases at the intersection. To avoid leakage the sealing sleeve is assembled around the hose-fitting intersection of the hose assembly. It is preferably connected via a stripe system, or alternatively, directly on the socket, for example as a preassembled part. When attached to the hose assembly the sealing sleeve will absorb fluid, like hydraulic oil, leaking from the hose assembly at the hose-fitting interface. The fluid is absorbed by the absorption layer, which is for example realized as an inner EPDM-layer of the sealing sleeve. The EPDM is swelling when getting in contact with hydraulic oil and will absorb the oil in doing this. In this way, advantageously no hydraulic oil is passed into the environment. When the EPDM layer is swelled with hydraulic oil the sensor arrangement, for example, a capacitive humidity sensor, will sense the change in humidity in the absorption layer and will give a signal to give notice that a leakage from the hose assembly will appear in the near future. The hose assembly according to the invention thus advantageously allows to avoid environmental hazards due to hose assembly leakage, and further also to optimize a run time of a hose assembly, as it does not have to be exchanged preventively. Furthermore, the sealing sleeve according to the invention may advantageously be used in combination with a hydraulic hose condition monitoring system that detects failure-related events within a hose to detect also leakage failures.

The invention is now further explicated with respect to the attached drawings. The information refers to the sealing sleeve according to the invention, as well as to the hose assembly. The described embodiments are exemplary and do not limit the scope of the invention.

FIG. 1 illustrates schematically a representation of a hose assembly 1 with an embodiment of a sealing sleeve 10 with leakage detection according to the invention. The hose assembly 1 comprises a connector 3 with a nipple 4 and a socket 5, and an end of a hose 6. The end of the hose 6 is slipped on the nipple 4 and the socket 5 is adapted to establish a fluid tight connection of the hose 6 and the nipple 5. The sealing sleeve 10 is attached at an intersection 7 (FIG. 3A) of the socket 5 and the hose 6, where a leakage of the hose assembly 1 is expected.

The sealing sleeve 10 with leakage detection is further explicated with respect to FIG. 2 illustrating a cross sections through the sealing sleeve 10, which comprises an absorbing layer 11 and a sensor arrangement 12, wherein the absorbing layer 11 is configured to be attached to a surface 2 of an article 1 containing a fluid, in this embodiment the hose assembly 1. The absorbing layer 11 will absorb the fluid in case of a leakage, and the sensor arrangement 12 is configured to detect a level of saturation of the absorbing layer 11 with the fluid. A thickness of the absorbing layer 11 increases with an amount of absorbed fluid to facilitate the sealing function of the sealing sleeve. For example, if the hose assembly is used to convey hydraulic oil, the absorbing layer 11 may consist of an EPDM rubber. The detection of the level of saturation of the absorbing layer 11 with the fluid is preferably performed with a capacitive humidity sensor, which is advantageously realized by the sensor arrangement 12, which, in the particular embodiment comprises two electrodes 14 with at least a portion of the absorption layer 11 acting as a dielectric between the two electrodes 14. This is achieved by attaching the two electrodes 14 to an outer side 15 of the absorption layer 11, opposite to a side 16 facing the surface 2 of the socket 5 connected to the hose 6.

Preferably, the sealing sleeve 10 further comprises at least one protective layer 17 covering the absorption layer 11 and the sensor arrangement 12. The sealing sleeve 10 according to FIG. 1 may advantageously be preassembled on the socket 5 of the hose connector 3. The two electrodes 14 of the sensor arrangement 12 would then be provided as annular rings arranged in parallel around the absorption layer 11.

An alternate embodiment of the sealing sleeve 10 is illustrated schematically in FIG. 3A through 3C, which depict three phases of a procedure of attaching the sealing sleeve 10, which is confected in terms of a strip, to the hose assembly 1. The two electrodes 14 of the sensor arrangement 12 are arranged in parallel along the strip. In FIG. 3A, the sealing sleeve strip 10 is arranged around the intersection 7 of the socket 5 and the hose 6, which is denoted by the curved arrow P. The cross section of the sealing sleeve strip 10 according to FIG. 2, is depicted by a hatched area in FIG. 3A. In FIG. 3B, the sealing sleeve strip 10 almost surrounds the circumference of the hose assembly 1. Fasteners 18 attached to one end of the strip 10 carry catches 19, which are configured to be connected to respective holding fixtures 20 on the other end of the strip 10. FIG. 3C shows the fastened sealing sleeve strip 10 in its final arrangement on the hose assembly 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

REFERENCE NUMERALS

1 Article containing a fluid, hose assembly
2 Surface
3 Connector
4 Nipple
5 Socket
6 End of hose
7 Intersection
10 Sealing sleeve
11 Absorbing layer
12 Sensor arrangement
14 Electrodes
15 Outer side
16 Inner Side
17 Protective Layer
18 Fastener
19 Catch
20 Holding Fixture
P Arrow

The invention claimed is:

1. A sealing sleeve with leakage detection, the sleeve comprising:
an absorbing layer; and
a sensor arrangement,
wherein the absorbing layer is configured to be attached to a surface of an article containing a fluid and to absorb the fluid in case of a leakage,
wherein the sensor arrangement includes a capacitive humidity sensor,
wherein a thickness of the absorbing layer increases with an amount of absorbed fluid, and
wherein the sensor arrangement is configured to detect a level of saturation of the absorbing layer with the fluid.

2. The sleeve of claim 1, wherein the absorbing layer includes an EPDM rubber.

3. The sleeve of claim 1, wherein the sensor arrangement includes a first electrode and a second electrode,
wherein at least a portion of the absorbing layer acts as a dielectric between the two electrodes.

4. The sleeve of claim 3, wherein the first and second electrodes are attached to an outer side of the absorbing layer, opposite to a side facing a surface of the article.

5. The sleeve of claim 1, wherein the sensor arrangement is configured to transmit a signal if the level of saturation changes.

6. The sleeve of claim 5, wherein the sensor arrangement is configured to transmit the signal prior to an emersion of the fluid from the absorbing layer.

7. The sleeve of claim 1, in the form of a strip.

8. The sleeve of claim 7, wherein the sensor arrangement includes a first and a second electrode, and
wherein the electrodes are arranged in parallel along the strip.

9. The sleeve of claim 1, further comprising a protective layer, covering the absorbing layer and the sensor arrangement.

10. A hose connector assembly, comprising:
the sleeve of claim 1; and
a hose connector,
wherein the sleeve is preassembled on the hose connector.

11. The hose connector assembly of claim 10, wherein the sensor arrangement includes a first and a second electrode,
wherein the electrodes are provided as annular rings arranged in parallel around the absorbing layer.

12. A hose assembly, comprising:
a connector including a nipple and a socket,
wherein an end of a hose is disposed on the nipple,
wherein the socket is configured to establish a fluid tight connection of the hose and the nipple,
wherein the sealing sleeve of claim 1 is attached at an intersection of the socket and the hose.

13. A strip, comprising:
an absorbing layer; and
a sensor arrangement,
wherein the sensor arrangement includes a capacitive humidity sensor,
wherein a thickness of the absorbing layer increases with an amount of absorbed fluid,
wherein the absorbing layer is configured to be attached to a surface of an article containing a fluid and to absorb the fluid in case of a leakage,
wherein the sensor arrangement is configured to detect a level of saturation of the absorbing layer with the fluid,
wherein the strip is configured to detect the leakage.

* * * * *